United States Patent [19]
Ogawa et al.

[11] Patent Number: 5,596,956
[45] Date of Patent: Jan. 28, 1997

[54] ELECTROMAGNETICALLY DRIVEN VALVE CONTROL SYSTEM FOR INTERNAL COMBUSTION ENGINES

[75] Inventors: Ken Ogawa; Kei Machida; Hiroshi Sono, all of Wako, Japan

[73] Assignee: Honda Giken Kogyo Kabushiki Kaisha, Tokyo, Japan

[21] Appl. No.: 573,439

[22] Filed: Dec. 15, 1995

[30] Foreign Application Priority Data

Dec. 16, 1994 [JP] Japan .................................. 6-333926
Dec. 16, 1994 [JP] Japan .................................. 6-333927

[51] Int. Cl.$^6$ ................................................ F01L 9/04
[52] U.S. Cl. .................................. 123/90.11; 123/179.3; 123/198 D
[58] Field of Search .................... 123/90.11, 198 D, 123/179.1, 179.3

[56] References Cited

U.S. PATENT DOCUMENTS

| | | | |
|---|---|---|---|
| 3,882,833 | 5/1975 | Longstaff et al. | 123/90.11 |
| 5,190,013 | 3/1993 | Dozier | 123/90.11 |
| 5,199,394 | 4/1993 | Hartmann et al. | 123/179.1 |
| 5,201,296 | 4/1993 | Wunning et al. | 123/479 |
| 5,219,397 | 6/1993 | Jones | 123/179.3 |
| 5,222,714 | 6/1993 | Morinigo et al. | 251/129.16 |
| 5,251,590 | 10/1993 | Faletti et al. | 123/179.21 |
| 5,337,713 | 8/1994 | Mill | 123/179.3 |

FOREIGN PATENT DOCUMENTS

| | | |
|---|---|---|
| 0043426 | 1/1982 | European Pat. Off. . |
| 62-243909 | 10/1987 | Japan . |
| 2-112606 | 4/1990 | Japan . |
| 3189310 | 8/1991 | Japan . |

*Primary Examiner*—Weilun Lo
*Attorney, Agent, or Firm*—Lyon & Lyon

[57] ABSTRACT

An electromagnetically driven valve control system for an internal combustion engine having at least one intake valve and at least one exhaust valve, and a starter for starting cranking of the engine. A CPU controls an energization time/timing control circuit section to electromagnetically drive at least one of the at least one intake valve and the at least one exhaust valve. The CPU detects a starting signal indicative of starting of the cranking of the engine, and a timer measures a time period elapsed after the starting signal is detected. An inhibiting time period is set, over which the operation of the starter means is inhibited, and the at least one of the at least one intake valve and the at least one exhaust valve is driven in a valve closing direction when the starting signal is detected. The operation of the starter is permitted when the time period elapsed after the starting signal is detected exceeds the inhibiting time period.

17 Claims, 6 Drawing Sheets

STARTING TIMING CONTROL

- ◇ ( IF : FLGIGON=1 & FLGSTT=1) (S1)
  - [ THEN ]
    - DECREMENT nSTT (S2)
    - ◇ ( IF : nSTT=0) (S3)
      - [ THEN ]
        - FLGCRK=1 (S4)
      - [ ELSE ]
        - FLGCRK= 0 (S5)
  - [ ELSE ]
    - RETRIEVE VB−nSTBASE TABLE (S6)
    - RETRIEVE TCOIL−KTCOIL TABLE (S7)
    - nSTT=KTCOIL×nSTBASE (S8)
    - FLGSTT=1 (S9)
    - FLGEVAC=1 (S10)
    - FLGCRK=0 (S11)
- → RETURN

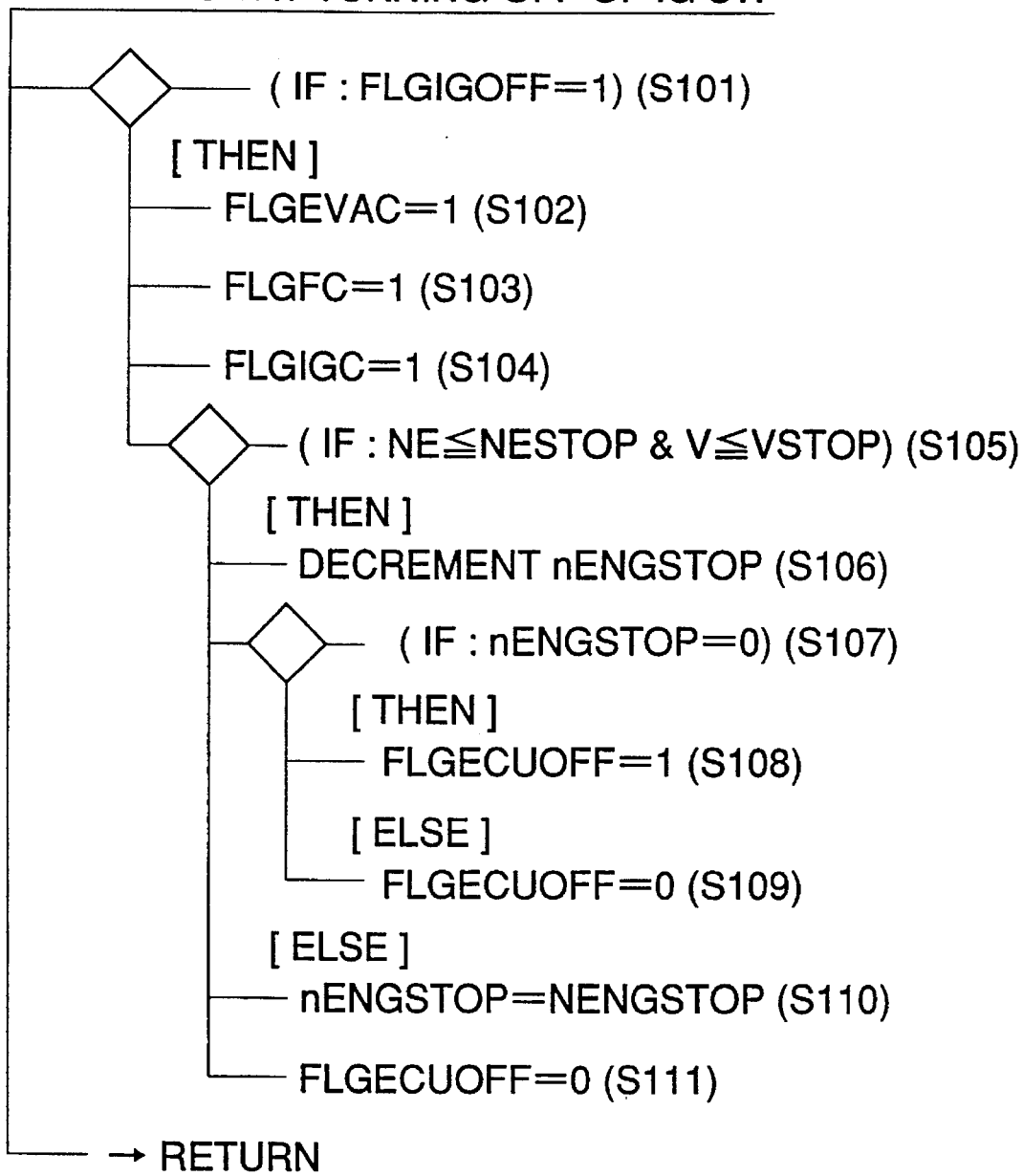

5,596,956

ELECTROMAGNETICALLY DRIVEN VALVE CONTROL SYSTEM FOR INTERNAL COMBUSTION ENGINES

BACKGROUND OF THE INVENTION

1. Field of the Invention

This invention relates to an electromagnetically driven valve control system for internal combustion engines, and more particularly to an electromagnetically driven valve control system of this kind, which controls intake valves and/or exhaust valves of the engine, which are electromagnetically driven.

2. Prior Art

A basic construction of an internal combustion engine having intake valves and/or exhaust valves of a electromagnetically driven type is disclosed by U.S. Pat. No. 3,882,833, in which the intake and/or exhaust valves are driven by springs and solenoids. Further, a control system for an internal combustion engine of this kind which employs the above basic construction is conventionally known, for example, from Japanese Laid-Open Patent Publication (Kokai) No. 2-112606, which is capable of changing the output timing of driving signals supplied to valve-driving solenoids according to the rotational speed of the engine.

Still further, an electromagnetically driven valve for use in the above basic construction has also been proposed, for example, by U.S. Pat. No. 5,222,714, which has an electromagnetic driving mechanism thereof improved such that an electromagnetic force required of the solenoid is reduced to the minimum.

However, none of the above proposed techniques contemplate the states of the intake valves and exhaust valves just before the start of the engine. As a result, there is a fear that if the intake valves and/or exhaust valves remain open when the engine starts to be cranked, the valves can collide with the pistons within the combustion chambers of the engine, and in the worst case intake valves, exhaust valves and/or engine components such as pistons can be broken or damaged. Besides, a disconnection in the wiring for supplying driving signals to the valves or the like causes the electromagnetic driving mechanism to fail. However, no electromagnetically driven valve control system has been proposed yet which has a function of detecting such a disconnection or the like.

In addition, none of the above proposed techniques contemplate the relationship between the timing of the stopping of the supply of electric power to the solenoids of the intake valves and exhaust valves and the positions of the respective pistons within the combustion chambers at the time of turning-off of the ignition switch of the engine. As a result, for example, the supply of electric power to the solenoids can be stopped before the engine is completely stopped and consequently intake valves and/or exhaust valves can unfavorably collide with pistons within combustion chambers, which can lead to breakage of the valves and/or engine components.

SUMMARY OF THE INVENTION

It is a first object of the invention to provide an electromagnetically driven valve control system for internal combustion engines, which is capable of suitably controlling the operations of electromagnetically driven intake valves and/or exhaust valves at the start of the engine, to prevent collision of the valves with the pistons of the engine and breakage of the valves and engine components and thereby ensure positive starting of the engine.

It is a second object of the invention is to provide an electromagnetically driven valve control system for the engines, which is capable of suitably controlling the operations of the electromagnetically driven intake valves and/or exhaust valves when the ignition switch of the engine is turned off, to thereby prevent collision of the valves with the pistons of the engine and breakage of the valves and engine components.

A third object of the invention is to easily detect failure of electromagnetically driving mechanisms for driving intake valves and/or exhaust valves of internal combustion engines.

According to a first aspect of the invention, there is provided an electromagnetically driven valve control system for an internal combustion engine having at least one intake valve and at least one exhaust valve, and starter means for starting cranking of the engine, comprising:

electromagnetic driving means for electromagnetically driving at least one of the at least one intake valve and the at least one exhaust valve;

starting signal-detecting means for detecting a starting signal indicative of starting of the cranking of the engine;

timer means for measuring a time period elapsed after the starting signal is detected;

starter operation-inhibiting time period-setting means for setting an inhibiting time period over which operation of the starter means is inhibited;

valve-closing control means responsive to detection of the starting signal for driving the at least one of the at least one intake valve and the at least one exhaust valve in a valve closing direction; and starter operation-permitting means for permitting operation of the starter means when the time period elapsed after detection of the starting signal exceeds the inhibiting time period.

Preferably, the at least one intake valve and the at least one exhaust valve each include solenoid means having at least one coil, the electromagnetically driven valve control system including a battery, battery voltage-detecting means for detecting output voltage of the battery, temperature-detecting means for detecting temperature of the coil of the solenoid means, the starter operation-inhibiting time period-setting means setting the inhibiting time period, based on the detected output voltage of the battery and the detected temperature of the coil.

More preferably, the starter operation-inhibiting time period-setting means sets the inhibiting time period to a larger value as the detected output voltage of the battery is lower or the detected temperature of the coil is higher.

According to a second aspect of the invention, there is provided an electromagnetically driven valve control system for an internal combustion engine having at least one intake valve and at least one exhaust valve, and starter means for starting cranking of the engine, comprising:

electromagnetic driving means for electromagnetically driving at least one of the at least one intake valve and the at least one exhaust valve;

starting signal-detecting means for detecting a starting signal indicative of starting of the cranking of the engine;

closure-detecting means for detecting a closed state of the at least one of the at least one intake valve and the at least one exhaust valve;

valve-closing control means responsive to detection of the starting signal for driving the at least one of the at least one intake valve and the at least one exhaust valve in a valve closing direction; and starter-operation permitting means responsive to detection of the closed state of the at least one of the at least one intake valve and the at least one exhaust valve, for permitting operation of the starter means.

According to a third aspect of the invention, there is provided an electromagnetically driven valve control system for an internal combustion engine having at least one intake valve and at least one exhaust valve, and starter means for starting cranking of the engine, comprising:

electromagnetic driving means for electromagnetically driving at least one of the at least one intake valve and the at least one exhaust valve;

starting signal-detecting means for detecting a starting signal indicative of starting of the cranking of the engine;

closure-detecting means for detecting a closed state of the at least one of the at least one intake valve and the at least one exhaust valve;

timer means for measuring a time period elapsed after the starting signal is detected;

starter operation-inhibiting time period-setting means for setting an inhibiting time period over which operation of the starter means is inhibited;

valve-closing control means responsive to detection of the starting signal for driving the at least one of the at least one intake valve and the at least one exhaust valve in a Valve closing direction; and failure-determining means for determining that abnormality occurs in the electromagnetic driving means, if the at least one of the at least one intake valve and the at least one exhaust valve is not in the closed state when the time period has elapsed after detection of the starting signal exceeds the inhibiting time period.

Preferably, the at least one intake valve and the at least one exhaust valve each include solenoid means having at least one coil, the electromagnetically driven valve control system including a battery, battery voltage-detecting means for detecting output voltage of the battery, temperature-detecting means for detecting temperature of the coil of the solenoid means, the starter operation-inhibiting time period-setting means setting the inhibiting time period, based on the detected output voltage of the battery and the detected temperature of the coil.

More preferably, the starter operation-inhibiting time period-setting means sets the inhibiting time period to a larger value as the detected output voltage of the battery is lower or the detected temperature of the coil is higher.

According to a fourth aspect of the invention, there is provided an electromagnetically driven valve control system for an internal combustion engine having at least one intake valve, and at least one exhaust valve, comprising:

electromagnetic driving means for electromagnetically driving at least one of the at least one intake valve and the at least one exhaust valve;

control means for delivering a control signal to the electromagnetic driving means to control same;

electric power supply means for supplying electric power to the control means;

stoppage signal-detecting means for detecting a stoppage signal indicative of stoppage of the engine;

vehicle speed-detecting means for detecting traveling speed of a vehicle in which the engine is installed;

engine speed-detecting means for detecting rotational speed of the engine;

timer means for measuring a time period elapsed after the detected traveling speed of the vehicle drops below a predetermined vehicle speed and at the same time the detected rotational speed of the engine drops below a predetermined rotational speed after detection of the stoppage signal;

valve-closing control means responsive to detection of the stoppage signal for driving the at least one of the at least one intake valve and the at least one exhaust valve in a valve closing direction; and electric power supply-interrupting means for interrupting supply of electric power to the control means when the time period measured by the timer means exceeds a predetermined time period.

Preferably, the predetermined vehicle speed is equal to or close to 0 km/h.

Also preferably, the predetermined rotational speed is equal to or close to 0 rpm.

The predetermined time period has a fixed value. Alternatively, the predetermined time period may have a variable value dependent upon a rate of change in the rotational speed of the engine occurring after detection of the stoppage signal and until the rotational speed of the engine drops to the predetermined rotational speed.

The above and other objects, features and advantages of the invention will become more apparent from the following detailed description taken in conjunction with the accompanying drawings.

BRIEF DESCRIPTION OF THE DRAWINGS

FIG. 6 is a flowchart showing a program for controlling the stopping timing of the supply of electric power to an energization time/timing control section of the control system, according to a further embodiment of the invention.

DETAILED DESCRIPTION

The invention will now be described in detail with reference to the drawings showing embodiments thereof.

Figure 1:
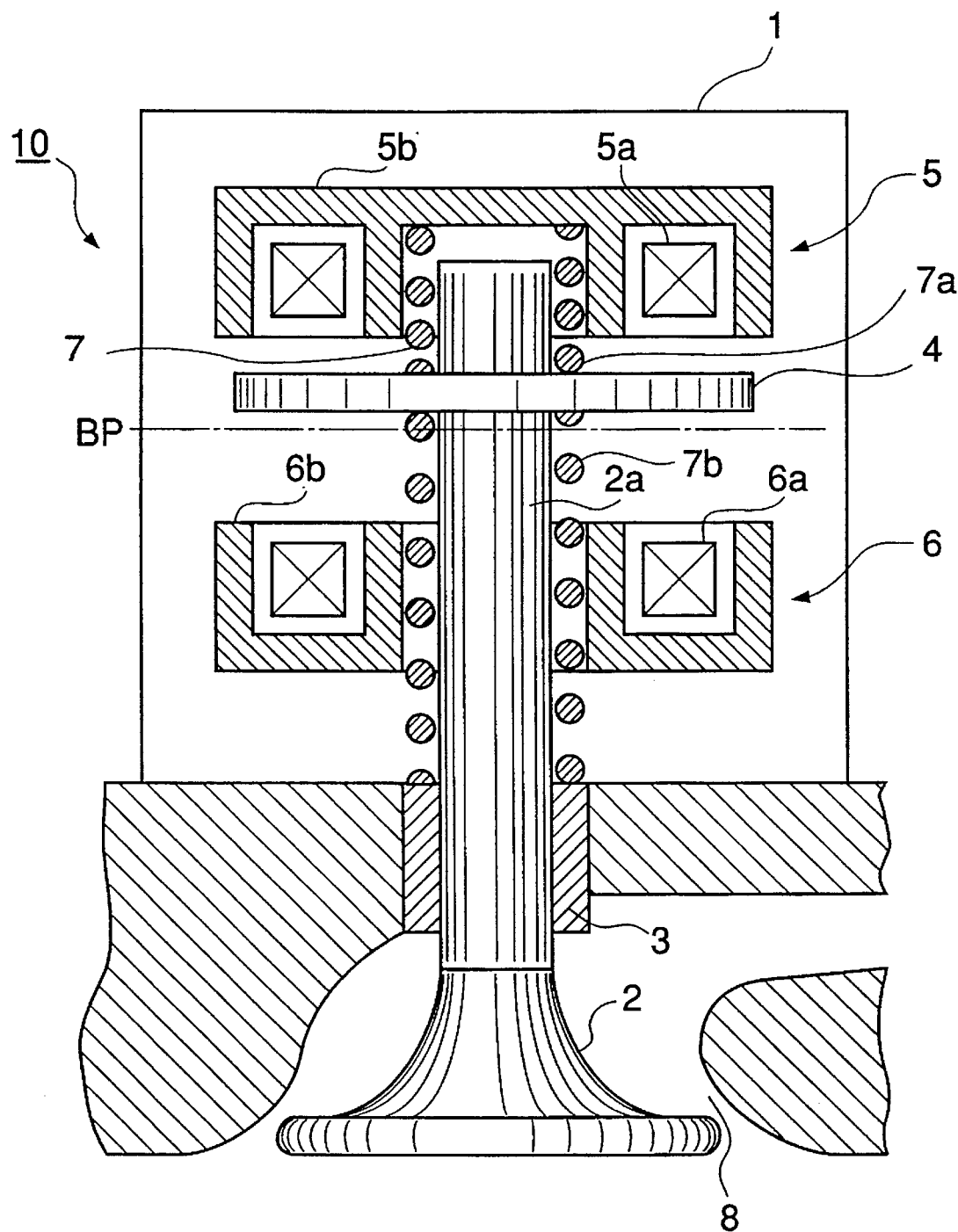
FIG. 1 is a longitudinal sectional view showing the construction of an electromagnetically driven intake valve which is controlled by an electromagnetically driven valve control system according to an embodiment of the invention.

Referring first to FIG. 1, there is illustrated the construction of an electromagnetically driven intake valve 10 employed in an electromagnetically driven valve control system according to an embodiment of the invention. The intake valve 10 is comprised of a valve element 2 which has a valve stem 2a with a magnetic element 4 as an armature secured thereon, and a valve driving section 1 for driving the valve element 2. The intake valve 10 is mounted in a head of a cylinder block of an internal combustion engine at a location above a combustion chamber C in such a fashion that the valve element 2 is slidably fitted through a valve guide 3, for opening and closing an intake port 8 opening into the combustion chamber C. An exhaust valve of the engine, not shown, has the same construction as above, and is mounted in the head of the cylinder block of the engine at a location above the combustion chamber C for opening and closing an exhaust port, not shown, of the combustion chamber C.

The valve driving section 1 is comprised of two solenoids (electromagnets) which are opposed to each other in the longitudinal direction, i.e. a closing solenoid 5 for biasing the valve element 2 in a valve closing direction and an opening solenoid 6 for biasing the valve element 2 in a valve opening direction, and a spring means 7 interposed between the closing solenoid 5 and the valve guide 3. The closing solenoid 5 is comprised of a coil 5a and a core member 5b, while the opening solenoid 6 is comprised of a coil 6a and a core member 6b. The spring means 7 is comprised of a first coiled spring 7a interposed between the core member 5b and the armature 4, and a second coiled spring 7b interposed between the armature 4 and the core member 6b, the first and second springs 7a, 7b being disposed such that the biasing force of the spring means 7 becomes zero when the armature 4 is positioned in a balanced or neutral position BP. The spring means 7 acts to bias the valve element 2 in the valve opening direction when the armature 4 is positioned upward of the neutral position BP as viewed in the figure, and it acts to bias the valve element 2 in the valve closing direction when the armature 4 is position downward of the neutral position BP.

With the above arrangement, by selectively energizing the closing solenoid 5 and the opening solenoid 6 with driving current, the valve element 2 moves between a fully closed position in which the the valve element 2 fully closes the intake port 8, and a fully open position in which the lift of the valve element 2 is the maximum. When neither the solenoid 5 nor the solenoid 6 is energized, the valve element 2 is positioned in the neutral position BP intermediate between the fully closed position and the fully open position.

Figure 2:
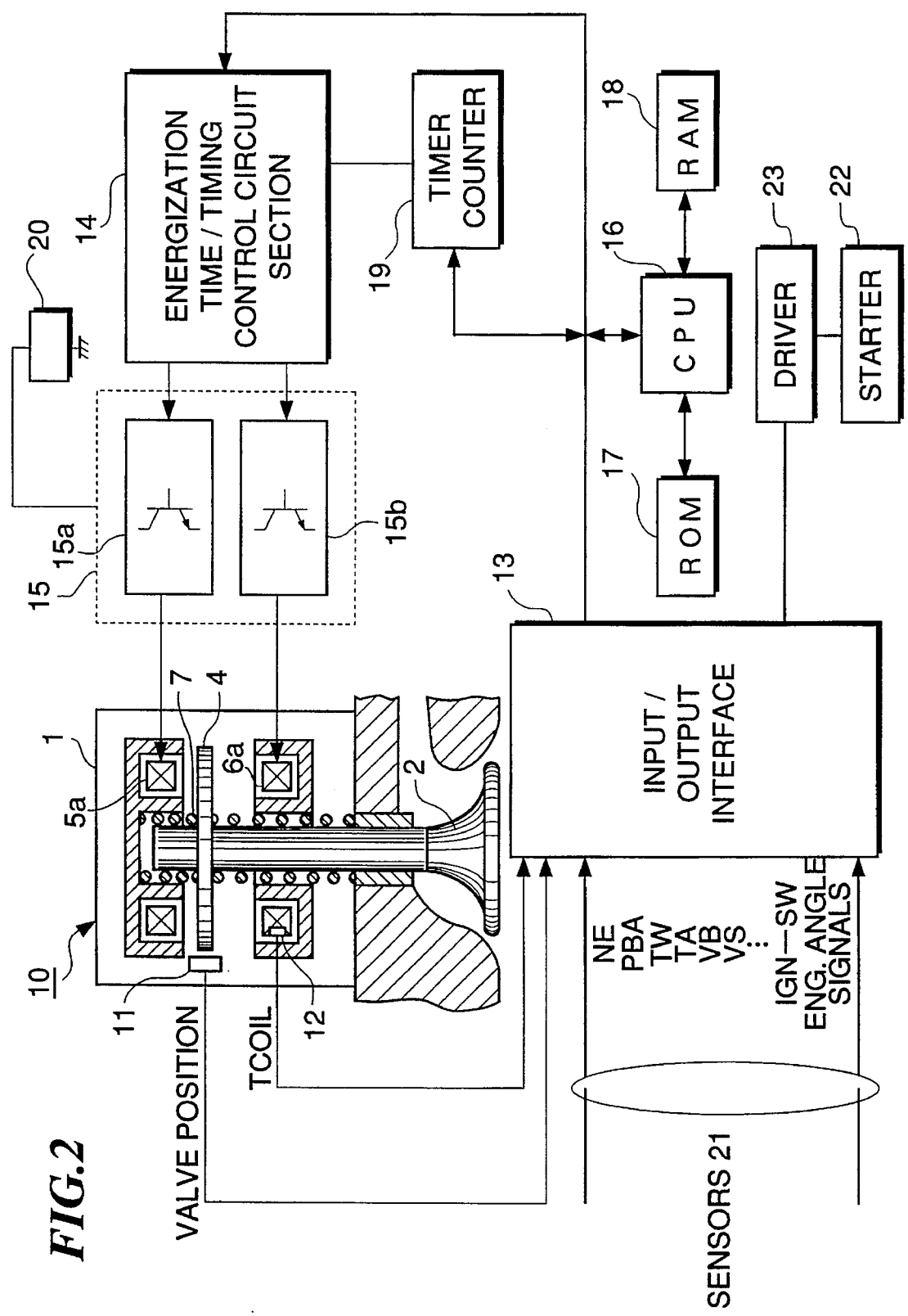
FIG. 2 is a schematic diagram showing the whole arrangement of the electromagnetically driven control system according to the embodiment.

FIG. 2 schematically shows the whole arrangement of the control system according to the embodiment, incorporating the above described intake valve 10. In the figure, the valve driving section 1 of the intake valve 10 is provided with a position sensor 11 for detecting the position of the armature 4, and a temperature sensor 12 for detecting the temperature TCOIL of the opening solenoid 6, signals indicative of the respective detected parameter values being supplied via an input/output interface 13 to a CPU (central processing unit) 16 as well as to an energization time/timing control circuit section 14. Further connected via the input/output interface 13 to the CPU 16 are other sensors 21 for detecting various parameters including the engine rotational speed NE, intake pipe absolute pressure PBA, engine coolant temperature TW, intake temperature TA, battery voltage BV, the vehicle speed VS of a vehicle in which the engine is installed, crankshaft rotational angle, and on/off states of an ignition switch of the engine, not shown, and supplying electric signals indicative of the respective detected parameter values to the CPU 16 and the energization time/timing control circuit section 14. Also connected via a driver 23 to the input/output interface 13 is a starter 22.

Also connected to the CPU 16 are a ROM 17 storing operational programs, etc. which are executed by the CPU 16, and a RAM 18 for storing data of results of calculations, detected parameter data from the sensors, etc. Further, a timer counter 19 functioning as a timer is connected to the energization time/timing control circuit section 14. The timer counter 19 is also connected to the CPU 16 to have its count value set by the CPU 16.

The energization time/timing control circuit section 14 is connected to a driver circuit 15 which is comprised of a closing solenoid-driving circuit 15a connected to the coil 5a of the closing solenoid 5 and an opening solenoid-driving circuit 15b connected to the coil 6a of the opening solenoid 6. A battery 20 is connected to the driver circuit 15 which is supplied with electric power therefrom. The control circuit section 14 controls the supply of electric current to the coils 5a and 6a to energize or deenergize the same.

Further, components circuits other than the driver circuit 15 including the CPU 16, ROM 17, input/output interface 13, etc. are supplied with supply voltage from the battery 20 via power circuits, not shown. When the ignition switch is turned off, the interrupting timing of supply of the supply voltage (electric power) to the control circuit section 14 is controlled by the CPU 16, as described hereinafter.

The engine to which is applied the present embodiment is a four-cylinder engine in which each cylinder is provided with two intake valves and two exhaust valves, and therefore totally 16 electromagnetically driven valves are used. The energization time/timing control circuit section 14, driver circuit 15, and timer counter 19 are provided for each of the 16 valves.

The CPU 16 determines the opening timing and closing timing of each of the intake and exhaust valves in response to input signals from the above various sensors, to thereby set the timer counter 19 for each of the intake and exhaust valves. Further, the CPU 16 controls the starting timing of the cranking of the engine, as described hereinbelow, as well as the interrupting timing of the supply of supply voltage to the control circuit section 14 at the time of turning-off of the ignition switch.

Immediately after the ignition switch is turned on, electric current is not applied to the solenoids 5 and 6, and accordingly the valve element of each of the intake and exhaust valves is in the neutral position BP.

Figure 3:
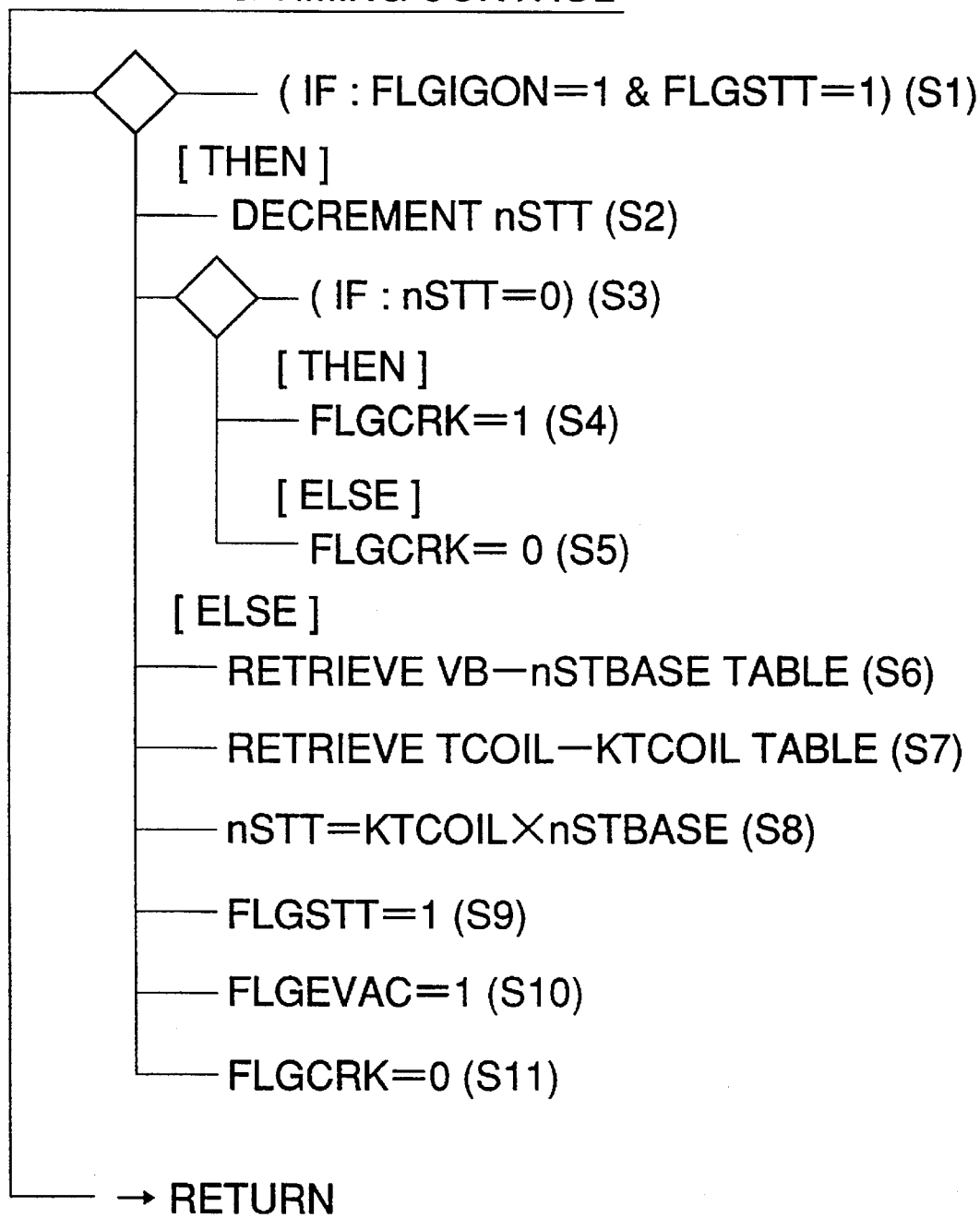
FIG. 3 is a flowchart showing a program for controlling the starting timing of cranking of the engine.

FIG. 3 shows a program for controlling the starting timing of the cranking of the engine. This program is started immediately after initialization of the CPU 16 and executed by the CPU 16 at predetermined time intervals (e.g. 40 msec). FIG. 3 as well as FIGS. 5 and 6, referred to hereinafter, are expressed in a program notation defined according to JIS X0128, i.e. in SPD (Structured Programming Diagrams).

First, at a step S1, it is determined whether or not an IG flag FLGIGON is set to "1" and at the same time a timer flag FLGSTT is set to "1". The IG flag FLGIGON indicates that the ignition switch has been turned on, when set to "1". The timer flag FLGSTT indicates that a down-counting timer nSTT which is to be set at a step S8, referred to hereinafter, has completed its setting, when set to "1". In the first loop of execution of the step S1, FLGSTT=0 holds, and then steps S6 to S11 are executed, followed by terminating the present program.

Figure 4A:
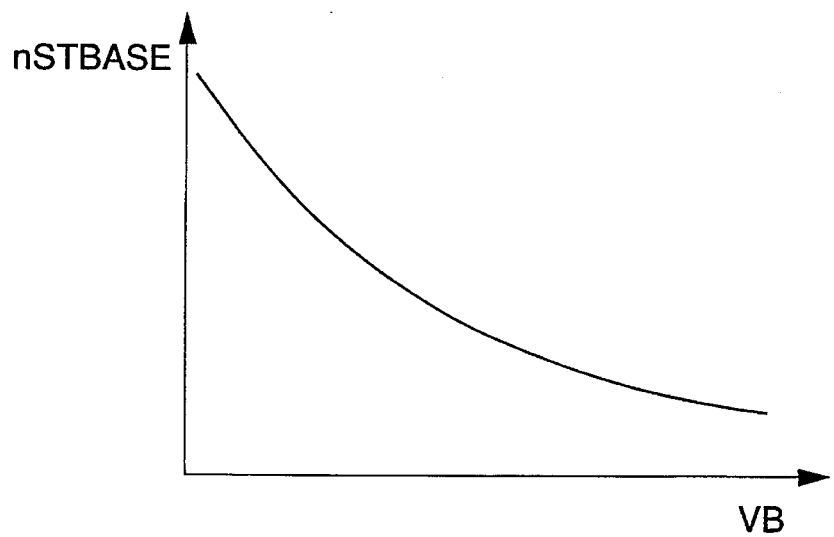
FIG. 4A shows a table used for determining a reference value nSTBASE of a delay count of a down-counting timer.

At the step S6, a VB-nSTBASE table is retrieved according to the battery voltage VB, to determine a reference value nSTBASE of a delay count value corresponding to a delay time or time lag from the time valve-closing command signals are output to all the intake valves and exhaust valve to the time all the intake valves and exhaust valves actually complete their closing actions. The VB-nSTBASE table is set, for example, as shown in FIG. 4A, such that the higher the battery voltage VB, the smaller the reference value nSTBASE.

Figure 4B:
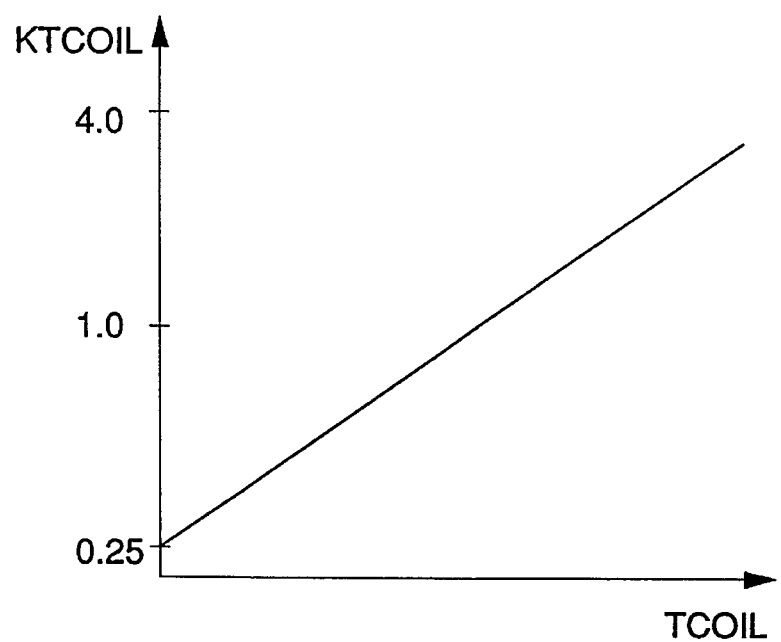
FIG. 4B shows a table used for determining a correction coefficient KTCOIL for correcting the reference value nSTBASE.

Next, at the step S7, a TCOIL-KTCOIL table is retrieved according to the coil temperature TCOIL of the solenoid 6, to determine a correction coefficient KTCOIL for correcting the reference value nSTBASE. The TCOIL-KTCOIL table is set, for example, as shown in FIG. 4B, such that the higher the coil temperature TCOIL, the larger the correction coefficient KTCOIL. As the coil temperature, the highest temperature value of the outputs from the temperature sensors 12 provided at the 16 valves is selected, for example.

At the step S8, the delay count value nSTT is calculated by the use of the following equation (1):

$$nSTT = KTCOIL \times nSTBASE \ldots \quad (1)$$

At the step S9, the timer flag FLGSTT is set to "1", and a valve-closing flag FLGEVAC which indicates that valve-closing command signals are to be output to the intake valves and exhaust valves, when set to "1", is set to "1" at the step S10. Then, a cranking-permitting flag FLGCRK which indicates that the cranking operation of the engine is to be permitted, when set to "1", is set to "0" at the step S11, followed by terminating the present program.

In the following loop of execution of the program, the answer to the question of the step S1 becomes affirmative (YES), and then the program proceeds to a step S2, wherein the delay count value nSTT is decremented. Then, it is determined at a step S3 whether or not the count value nSTT is equal to "0". If nSTT>0 holds, the cranking-permitting flag FLGCRK is again set to "0" to maintain the engine in a cranking-inhibiting state at a step S5, followed by terminating the program. On the other hand, if nSTT=0 holds, i.e. if the set delay time has elapsed at the step S3, the cranking-permitting flag FLGCRK is set to "1" at a step S4, to permit the cranking operation of the engine to be carried out.

As described above, according to the present embodiment, the delay time is set according to the battery voltage VB and the coil temperature TCOIL when the valve-closing command signals for all the intake valves and exhaust valves have been output, and the cranking operation of the engine is permitted after the set delay time has elapsed. Therefore, only after completion of closing operations of all the intake valves and exhaust valves, the cranking operation of the engine is started, and as a result, the intake valves and exhaust valves can be prevented from colliding with the pistons, etc., ensuring positive starting of the engine.

Figure 5:
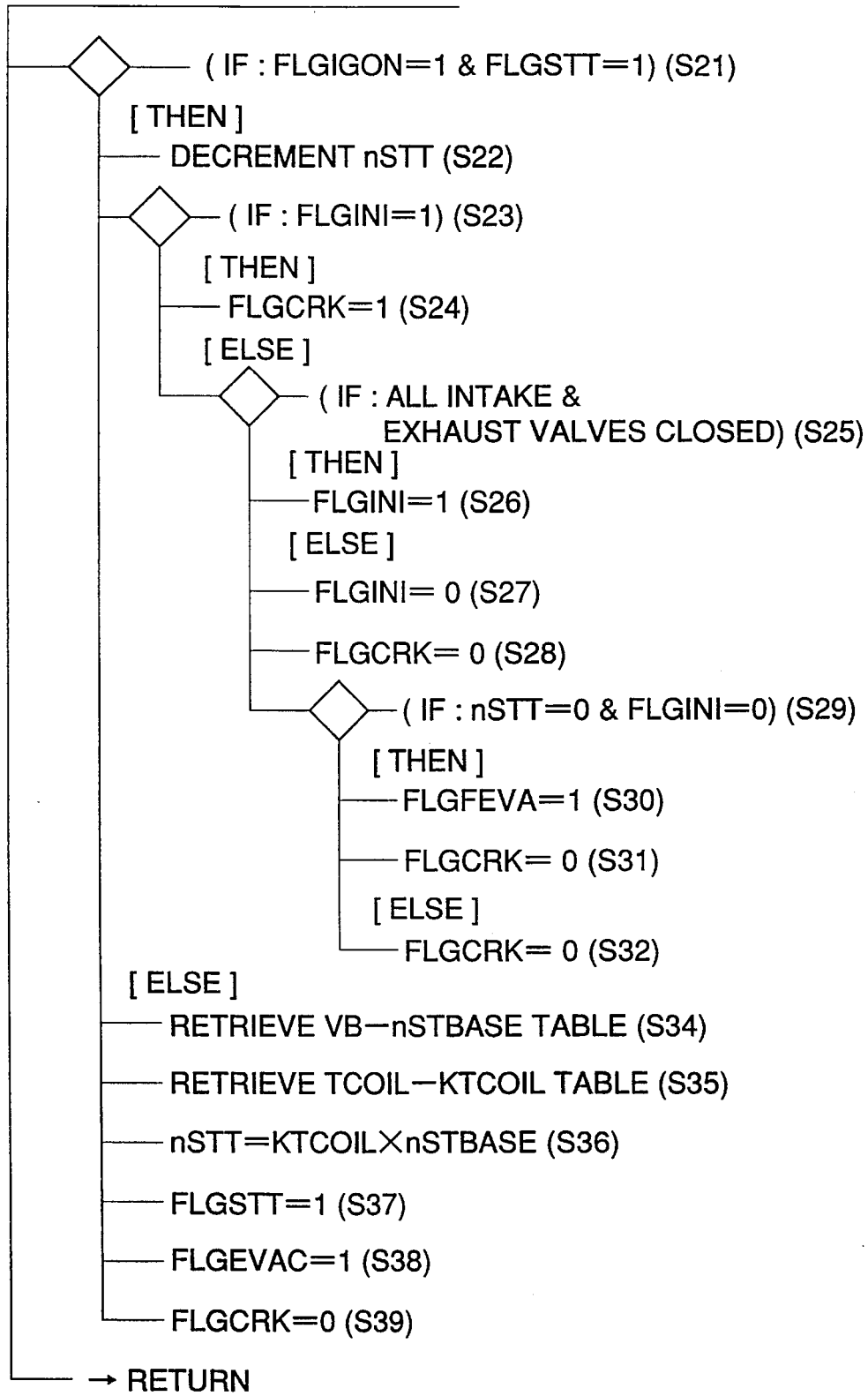
FIG. 5 is a flowchart showing a program for controlling the starting timing of cranking of the engine according to another embodiment of the invention.

FIG. 5 shows a program for controlling the starting timing of the cranking of the engine, according to another embodiment of the invention. The present program is started immediately after initialization of the CPU 16 and executed by the CPU 16 at predetermined time intervals (e.g. 40 msec). The control according to the present embodiment can be realized by the hardware construction of FIG. 2.

Steps S21, S22, and S34 to S39 in FIG. 5 are identical with the steps S1, S2, and S6 to S11 in FIG. 3, respectively. More specifically, after the delay count value nSTT of the down-counting timer and the flags FLGSTT, FLGEVAC, and FLGCRK are set at the steps S34 to S39, the nSTT value is decremented at the step S22, followed by the program proceeding to a step S23.

At the step S23, it is determined whether or not a valve-closing completion detection flag FLGINI which indicates that all the intake valves and exhaust valves have completed their valve closing actions, when set to "1", is set to "1". In the first loop of execution of the step S23, FLGINI=0 holds, and then the program proceeds to a step S25, wherein it is determined whether or not completion of closing of all the intake valves and exhaust valves has been detected. This determination is carried out based on the output from the position sensor 11 provided for each valve.

In the first loop of execution of the step S25, the answer is negative (NO), and therefore the valve-closing completion detection flag FLGINI and the cranking-permitting flag FLGCRK are both set to "0" at respective steps S27 and S28. Then, it is determined at a step S29 whether or not the delay count value nSTT is equal to "0" and at the same time the valve-closing completion detection flag FLGINI is set to "0". In the first loop of execution of the step S29, the answer is also negative (NO), and then the program proceeds to a step S32, wherein the cranking-permitting flag FLGCRK is set to "0", followed by terminating the present program.

If the answer to the question of the step S25 subsequently becomes affirmative (YES), i.e. if completion of closing of all the intake valves and exhaust valves has been detected, the valve-closing completion detection flag FLGINI is set to "1" at a step S26, followed by terminating the program. In the next and subsequent loops, the answer to the question of the step S23 becomes affirmative (YES), and then the cranking-permitting flag FLGCRK is set to "1" at a step S24, to thereby permit starting the cranking operation of the engine.

On the other hand, if the set delay time has elapsed so that the delay count value nSTT of the counter is set to "0" before completion of closing of all the intake valves and exhaust valves is detected, the answer to the question of the step S29 becomes affirmative (YES). In this case, although the valve-closing command signals have been output, all the intake valves and exhaust valves have not completed their valve closing actions within the set delay time. Therefore, it is determined that a failure has occurred in at least one of the driving systems for the intake valves and exhaust valves. Then, a failure determination flag FLGFEVA is set to "1" at a step S30, and the cranking-inhibiting state is maintained at a step S31, followed by terminating the program.

As described above, according to the present embodiment, only when completion of closing of all the intake valves and exhaust valves has been detected, the cranking operation is permitted to be started. As a result, the intake valves and exhaust valves can be prevented from colliding with the pistons, to thereby ensure positive starting of the engine.

Besides, if all the intake valves and exhaust valves do not complete their closing actions within the set delay time, it is determined that a failure has occurred in at least one of the driving systems for the intake valves and exhaust valves. This facilitates detection of failure of the electromagnetically driven intake valves and exhaust valves.

Although in the above described embodiments, the coil temperature TCOIL is detected by the temperature sensor 12, it may be estimated as a function of the engine coolant temperature TW or the intake temperature TA, or a function of the engine coolant temperature TW and the intake temperature TA.

FIG. 6 shows a program for controlling the timing of supply of electric power to the energization time/timing control section 14 at the time of turning-off of the ignition switch of the engine, according to a further embodiment of the invention. This program is executed by the CPU 16 at predetermined time intervals (e.g. 40 msec). Also the control according to the present embodiment can be realized by the hardware construction of FIG. 2.

First, at a step S101, it is determined whether or not an IG-off flag FLGIGOFF is set to "1", and if FLGIGOFF=0 holds, the program is immediately terminated. The IG-off flag FLGIGOFF indicates that the ignition switch has been turned off, when set to "1".

When the ignition switch has been turned off and hence FLGIGOFF=1 holds, the program proceeds to a step S102, wherein the valve-closing flag FLGEVAC is set to "1". Then, an FC flag FLGFC which indicates that the fuel supply has been interrupted, when set to "1", is set to "1" at a step S103, and an ignition stoppage flag FLGIGC which indicates that the ignition operation has been stopped, when set to "1", is set to "1" at a step S104.

Then, it is determined at a step S105 whether or not the engine rotational speed NE is below a predetermined value NESTOP (e.g. equal to 0 rpm or close to 0 rpm) and at the same time the vehicle speed VS is below a predetermined value VSTOP (e.g. equal to 0 km/h or close to 0 km/h). Even if the ignition switch has been turned off, the engine rotational speed NE does not immediately drop to 0 rpm, and therefore in the first loop of execution of the step S105, NE>NESTOP holds, followed by the program proceeding to a step S110. At the step 110, a down-counter nENGSTOP is set to a predetermined time period NENGSTOP, and a supply voltage-interrupting flag FLGECUOFF which indicates that the feeding of the supply voltage to the control circuit section 14 is to be interrupted, when set to "1", is set to "0" at a step S111 to continue the feeding of the supply voltage to the control circuit section 14, followed by terminating the program.

The predetermined time period NENGSTOP set in the counter nENGSTOP is a fixed value. However, to compensate for variations between individual engines to which the invention is applied, or changes in characteristics of the same due to aging, the NENGSTOP value may be set to a variable value which depends on a rate of change in the engine rotational speed NE occurring after FLGIGOFF=1 holds and until the NE value drops to the predetermined value NESTOP.

Thereafter, if NE≦NESTOP and at the same time VS≦VSTOP become satisfied at the step S105, the program proceeds to a step S106, wherein the count value of the counter nENGSTOP is decremented, and then it is determined at a step S107 whether or not the thus decremented count value of the counter nENGSTOP is equal to "0". In the first loop of execution of the step S107, nENGSTOP>0 holds, and therefore the program proceeds to a step S109, wherein the supply voltage-interrupting flag FLGECUOFF is set to "0", to allow the feeding of the supply voltage to be continued, followed by terminating the present routine.

Thereafter, if the predetermined time period corresponding to the set value NENGSTOP of the counter nENGSTOP has elapsed so that the nENGSTOP=0 holds at the step S107, the program proceeds to a step S108, wherein the supply voltage-interrupting flag FLGECUOFF is set to "1", to interrupt the feeding of the supply voltage to the control circuit section 14, followed by terminating the present routine.

As described above, according to the present embodiment, when the ignition switch is turned off, first the valve-closing command signals are delivered to the intake valves and exhaust valves to close them, while the supply voltage is continuously fed to the energization time/timing control circuit section 14 which controls the intake valves and exhaust valves, over the predetermined time period after the engine rotational speed NE drops below the predetermined engine value NESTOP and the vehicle speed VS drops below the predetermined value VSTOP. Therefore, the intake valves and exhaust valves are kept closed after turning-off the ignition switch and until the engine becomes completely stopped. As a result, the intake valves and exhaust valves can be positively prevented from colliding with the pistons.

Although in the above described embodiments, both the intake valves and the exhaust valves are of the electromagnetically driven type, this is not limitative. Alternatively, either the intake valves or the exhaust valves may be formed by valves which are driven by conventional mechanical driving means.

What is claimed is:

1. An electromagnetically driven valve control system for an internal combustion engine having at least one intake valve and at least one exhaust valve, and starter means for starting cranking of said engine, comprising:

electromagnetic driving means for electromagnetically driving at least one of said at least one intake valve and said at least one exhaust valve;

starting signal-detecting means for detecting a starting signal indicative of starting of said cranking of said engine;

timer means for measuring a time period elapsed after said starting signal is detected;

starter operation-inhibiting time period-setting means for setting an inhibiting time period over which operation of said starter means is inhibited;

valve-closing control means responsive to detection of said starting signal for driving said at least one of said at least one intake valve and said at least one exhaust valve in a valve closing direction; and starter operation-permitting means for permitting operation of said starter means when said time period elapsed after detection of said starting signal exceeds said inhibiting time period.

2. An electromagnetically driven valve control system as claimed in claim 1, wherein said at least one intake valve and said at least one exhaust valve each include solenoid means having at least one coil, said electromagnetically driven valve control system including a battery, battery voltage-detecting means for detecting output voltage of said battery, temperature-detecting means for detecting temperature of said coil of said solenoid means, said starter operation-inhibiting time period-setting means setting said inhibiting time period based on the detected output voltage of said battery and the detected temperature of said coil.

3. An electromagnetically driven valve control system as claimed in claim 2, wherein said starter operation-inhibiting time period-setting means sets said inhibiting time period to a larger value as the detected output voltage of said battery is lower or the detected temperature of said coil is higher.

4. An electromagnetically driven valve control system for an internal combustion engine having at least one intake valve and at least one exhaust valve, and starter means for starting cranking of said engine, comprising:

electromagnetic driving means for electromagnetically driving at least one of said at least one intake valve and said at least one exhaust valve;

starting signal-detecting means for detecting a starting signal indicative of starting of said cranking of said engine;

closure-detecting means for detecting a closed state of said at least one of said at least one intake valve and said at least one exhaust valve;

valve-closing control means responsive to detection of said starting signal, for driving said at least one of said at least one intake valve and said at least one exhaust valve in a valve closing direction; and starter-operation permitting means responsive to detection of said closed state of said at least one of said at least one intake valve and said at least one exhaust valve for permitting operation of said starter means.

5. An electromagnetically driven valve control system for an internal combustion engine having at least one intake valve and at least one exhaust valve, and starter means for starting cranking of said engine, comprising:

electromagnetic driving means for electromagnetically driving at least one of said at least one intake valve and said at least one exhaust valve;

starting signal-detecting means for detecting a starting signal indicative of starting of said cranking of said engine;

closure-detecting means for detecting a closed state of said at least one of said at least one intake valve and said at least one exhaust valve;

timer means for measuring a time period elapsed after said starting signal is detected;

starter operation-inhibiting time period-setting means for setting an inhibiting time period over which operation of said starter means is inhibited;

valve-closing control means responsive to detection of said starting signal for driving said at least one of said at least one intake valve and said at least one exhaust valve in a valve closing direction; and failure-determining means for determining that abnormality occurs in said electromagnetic driving means, if said at least one of said at least one intake valve and said at least one exhaust valve is not in said closed state when said time period has elapsed after detection of said starting signal exceeds said inhibiting time period.

6. An electromagnetically driven valve control system as claimed in claim 5, wherein said at least one intake valve and said at least one exhaust valve each include solenoid means having at least one coil, said electromagnetically driven valve control system including a battery, battery voltage-detecting means for detecting output voltage of said battery, temperature-detecting means for detecting temperature of said coil of said solenoid means, said starter operation-inhibiting time period-setting means setting said inhibiting time period based on the detected output voltage of said battery and the detected temperature of said coil.

7. An electromagnetically driven valve control system as claimed in claim 6, wherein said starter operation-inhibiting time period-setting means sets said inhibiting time period to a larger value as the detected output voltage of said battery is lower or the detected temperature of said coil is higher.

8. An electromagnetically driven valve control system for an internal combustion engine having at least one intake valve, and at least one exhaust valve, comprising:

electromagnetic driving means for electromagnetically driving at least one of said at least one intake valve and said at least one exhaust valve;

control means for delivering a control signal to said electromagnetic driving means to control same;

electric power supply means for supplying electric power to said control means;

stoppage signal-detecting means for detecting a stoppage signal indicative of stoppage of said engine;

vehicle speed-detecting means for detecting traveling speed of a vehicle in which said engine is installed;

engine speed-detecting means for detecting rotational speed of said engine;

timer means for measuring a time period elapsed after the detected traveling speed of said vehicle drops below a predetermined vehicle speed and at the same time the detected rotational speed of said engine drops below a predetermined rotational speed after detection of said stoppage signal;

valve-closing control means responsive to detection of said stoppage signal for driving said at least one of said at least one intake valve and said at least one exhaust valve in a valve closing direction; and electric power supply-interrupting means for interrupting supply of electric power to said control means when said time period measured by said timer means exceeds a predetermined time period.

9. An electromagnetically driven valve control system as claimed in claim 8, wherein said predetermined vehicle speed is equal to or close to 0 km/h.

10. An electromagnetically driven valve control system as claimed in claim 8, wherein said predetermined rotational speed is equal to or close to 0 rpm.

11. An electromagnetically driven valve control system as claimed in any of claims 8 to 10, wherein said predetermined time period has a fixed value.

12. An electromagnetically driven valve control system as claimed in any of claims 8 to 10, wherein said predetermined time period has a variable value dependent upon a rate of change in said rotational speed of said engine occurring after detection of said stoppage signal and until said rotational speed of said engine drops to said predetermined rotational speed.

13. An electromagnetically driven valve control system for an internal combustion engine having a combustion cylinder with a valve, comprising:

electromagnetic driving means for electromagnetically driving said valve;

starting signal-detecting means for detecting a starting signal indicative of a command for starting cranking of the engine;

valve-closing control means responsive to detection of said starting signal for driving said valve in a valve closing direction; and control means for delaying said starting cranking of the engine until said valve is closed in response to said valve-closing control means.

14. An electromagnetically driven valve control system for an internal combustion engine having a combustion cylinder with a valve, comprising:

electromagnetic driving means for electromagnetically driving said valve;

control means for delivering a control signal to said electromagnetic driving means to control same;

starting signal-detecting means for detecting a signal indicative of a command to start cranking the engine;

stoppage signal-detecting means for detecting a signal indicative of a command to stop the engine;

said control means responsive to detection of said signal for starting cranking and said signal to stop the engine for driving said valve in a valve closing direction in response to each said signal; and said control means including means for maintaining said valve in a closed position after responding to each said signal for a period that avoids interference between said valve and a piston in the combustion cylinder during the starting of cranking and the stopping of the engine.

15. An electromagnetically driven valve control system as claimed in either of claims 13 or 14, wherein said control means includes closure-detecting means for detecting a closed state of said valve.

16. An electromagnetically driven valve control system as claimed in either of claims 13 or 14, wherein said control means includes failure-determining means for determining that an abnormality occurs in said electromagnetic driving means if said valve is not in a closed state when a predetermined time period has elapsed after detection of said starting signal.

17. An electromagnetically driven valve control system for an internal combustion engine having a combustion cylinder with a valve, comprising:

electromagnetic driving means for electromagnetically driving said valve;

stopping signal-detecting means for detecting a stoppage signal indicative of a command for stopping of the engine;

valve-closing control means responsive to detection of said stopping signal for driving said valve in a valve closing direction; and control means for maintaining said valve in a closed position in response to said valve-closing control means until the engine substantially stops.

* * * * *